United States Patent
Valentine et al.

(10) Patent No.: US 6,749,166 B2
(45) Date of Patent: Jun. 15, 2004

(54) FLASHLIGHT HOLDER

(76) Inventors: Mike Valentine, 2316 47th St., Everett, WA (US) 98203; David Valentine, 4615 W. View Dr., Everett, WA (US) 98203

( * ) Notice: Subject to any disclaimer, the term of this patent is extended or adjusted under 35 U.S.C. 154(b) by 0 days.

(21) Appl. No.: 10/293,587

(22) Filed: Nov. 13, 2002

(65) Prior Publication Data

US 2004/0089778 A1 May 13, 2004

(51) Int. Cl.[7] ................................................. A47F 5/00
(52) U.S. Cl. ................. 248/309.1; 24/115 H; 248/160; 362/191
(58) Field of Search ............................ 248/309.1, 309.4, 248/206.5, 160, 104; 362/191; 24/115 H, 118 G, 482

(56) References Cited

U.S. PATENT DOCUMENTS

| | | | |
|---|---|---|---|
| 3,713,614 A | * 1/1973 | Taylor | 248/632 |
| 4,895,329 A | 1/1990 | Sloan | |
| 4,897,768 A | 1/1990 | Thul | |
| 5,103,384 A | 4/1992 | Drohan | |
| 5,163,752 A | 11/1992 | Copeland | |
| 5,489,075 A | * 2/1996 | Ible | 248/104 |
| 5,697,128 A | * 12/1997 | Peregrine | 24/115 G |
| 6,029,321 A | * 2/2000 | Fisher | 24/306 |
| 6,173,725 B1 | * 1/2001 | Garth | 135/87 |
| 6,553,634 B2 | * 4/2003 | Ogawa | 24/339 |
| 6,598,838 B2 | * 7/2003 | Suh | 248/104 |

* cited by examiner

Primary Examiner—Ramon O. Ramirez
(74) Attorney, Agent, or Firm—Seed IP Law Group PLLC

(57) ABSTRACT

A flashlight holder having a base (1), (12) connected to a flexible tube (2) which is connected to a seat (4) which has a flexible strap (7) system including a sliding unit (5) which controls tension on flexible strap (7) system, for the purpose of quickly, easily, and unobtrusively securing a flashlight (8) without damaging it.

34 Claims, 9 Drawing Sheets

FLASHLIGHT HOLDER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to flashlight holding devices.

2. Background of the Invention

There are various flashlight holders that have been created which hold a flashlight, but do not have much flexibility to adjust for different-sized flashlights and hold them securely. They are not designed to be used in high-shock conditions. This is especially important if a worker is using flashlight holder high in the air above a delicate work surface or one where dropping flashlight, after bumping it and it dislodging, would mean losing it in a hollow work space.

Many of these flashlight holders have bases which are singular in their method of attaching and or interfacing with a given work surface. Some have only magnets, for example, so they're only useful if there's a metal work surface available. Most of these other flashlight holders are also prohibitively expensive to manufacture and therefore purchase for industry and or the consumer. Also, most of the other flashlight holders cannot hold a flashlight without the risk of damaging the flashlight, are heavy in weight, and corrosive. They are also complicated to operate and do not have the capability of changing length like our flashlight holder, where sections of flexible tube can be added or removed.

U.S. Pat. No. 5,103,384 to Drohan (1992) discloses a flashlight holder with a clamp style base and flexible tube. This flashlight holder also has problems in that it is not adjustable in the collar that holds the flashlight and the ball and socket joint where the tube connects to the seat is a mechanism for tightening and is a complicated and obtrusive way of trying to secure a position for the flashlight. A person would have to hold the bottom of flexible tube while holding collar with flashlight and trying to twist winged bracket to a given desired locked position. There isn't any elasticity in collar holding flashlight for high-shock conditions. It also does not have a means of quick attachment or release and is not able to adjust in length removing movable units which comprise flexible tube.

U.S. Pat. No. 4,895,329 to Sloan (1990) discloses a flashlight holder with a clamp style base which has a very thin spring clamp seat for flashlight which is not very supportive in that it is very thin in its profile and it is used in singularity. It also has no adjustment, in terms of height, of how it holds flashlight. U.S. Pat. No. 4,897,768 to Thul (1990) discloses a flashlight holder which has many disadvantages, compared to our flashlight holder, in that it has no way to clamp or be magnetized to attract a metal work surface. Also, it is very limited in its flexibility to direct the flashlight because of the way it moves fore and aft on a track that is radiused in its height, therefore directing light in a set format that matches the track instead of it being able to be directed in an infinite manner.

U.S. Pat. No. 5,163,752 to Copeland (1992) discloses a flashlight holder with a clamp attached to a flexible positioning tube which in turn is fastened to a base with straps to attach a flashlight. This flashlight holder also has some disadvantages in that the base used for attaching flashlight to is flat instead of concave and the base has just a clamp, which limits its ability to interface with a work surface since the only option is clamping. The strap that holds flashlight to flat base also, does not have any adjustability.

BACKGROUND OF THE INVENTION—OBJECTS AND ADVANTAGES

Accordingly, several objects and advantages of the present invention are:

(a) to provide a flashlight holder which is low cost, lightweight, and durable, which both industry and consumers can afford;

(b) to provide a flashlight holder which is flexible enough to position so it can stand on its own;

(c) to provide a flashlight holder which can hold and support virtually any size and shape of flashlight, but is especially disposed to holding the smaller flashlights which are becoming more and more popular;

(d) to provide a flashlight holder which can be used in outdoor and wet conditions without problems with corrosion;

(e) to provide a flashlight holder which can have different colored flexible tubes which gives flashlight holder a variety of appearances and color combinations;

(f) to provide a flashlight holder which can be used without being held or supported by user;

(g) to provide a flashlight holder which can be positioned to hold flashlight in an infinite number of positions;

(h) to provide a flashlight holder which can be handled by wet or greasy hands without slipping;

(i) to provide a flashlight holder that will hold a flashlight securely without damaging it;

(j) to provide a flashlight holder that is lightweight, durable, and easy to operate for all ages; and (k) to provide a flashlight holder that is customizable in terms of length of flexible tube and therefore the flashlight holder length or height altogether. Further objects and advantages are to provide a flashlight holder which can be used easily and conveniently to hold virtually any size flashlight, although especially the small flashlights, in infinite positions. This flashlight holder can be attached to an object near the work surface by magnetic, clamping, or self-standing means. The flashlight can easily be attached to or detached from flashlight holder and made adjustable to hold various-sized flashlights securely, and without damage.

SUMMARY

In accordance with the present invention a flashlight holder comprises a base attached to a flexible tube, which in turn is attached to a seat with an adjustable strap system of attaching a flashlight securely, and without damage.

DRAWINGS—FIGURES

In the drawings, closely related figures have the same number but different alphabetic suffixes.

DRAWINGS—Reference Numerals

| 1 | clamp base | 2 | flexible tube |
|---|---|---|---|
| 3 | retaining clip | 4 | seat |
| 5 | sliding unit | 6 | grip unit |
| 7 | flexible strap | 8 | flashlight |
| 9 | anchoring retaining clip | 10 | locknut |
| 11 | upper fastener | 12 | magnetic base |
| 13 | magnetic base locknut | 14 | magnetic base fastener |
| 15 | oversize flexible tube | 16 | oversize washer |
| 17 | oversize locknut | 18 | oversize locknut |
| 19 | oversize washer | 20 | oversize fastener |
| 21 | plate | 22 | oversize flashlight |
| 23 | oversize fastener | 24 | clamp base fastener |
| 25 | clamp base locknut | | |

DETAILED DESCRIPTION—FIG. 1-1-8
PREFERRED EMBODIMENT

Figure 1:
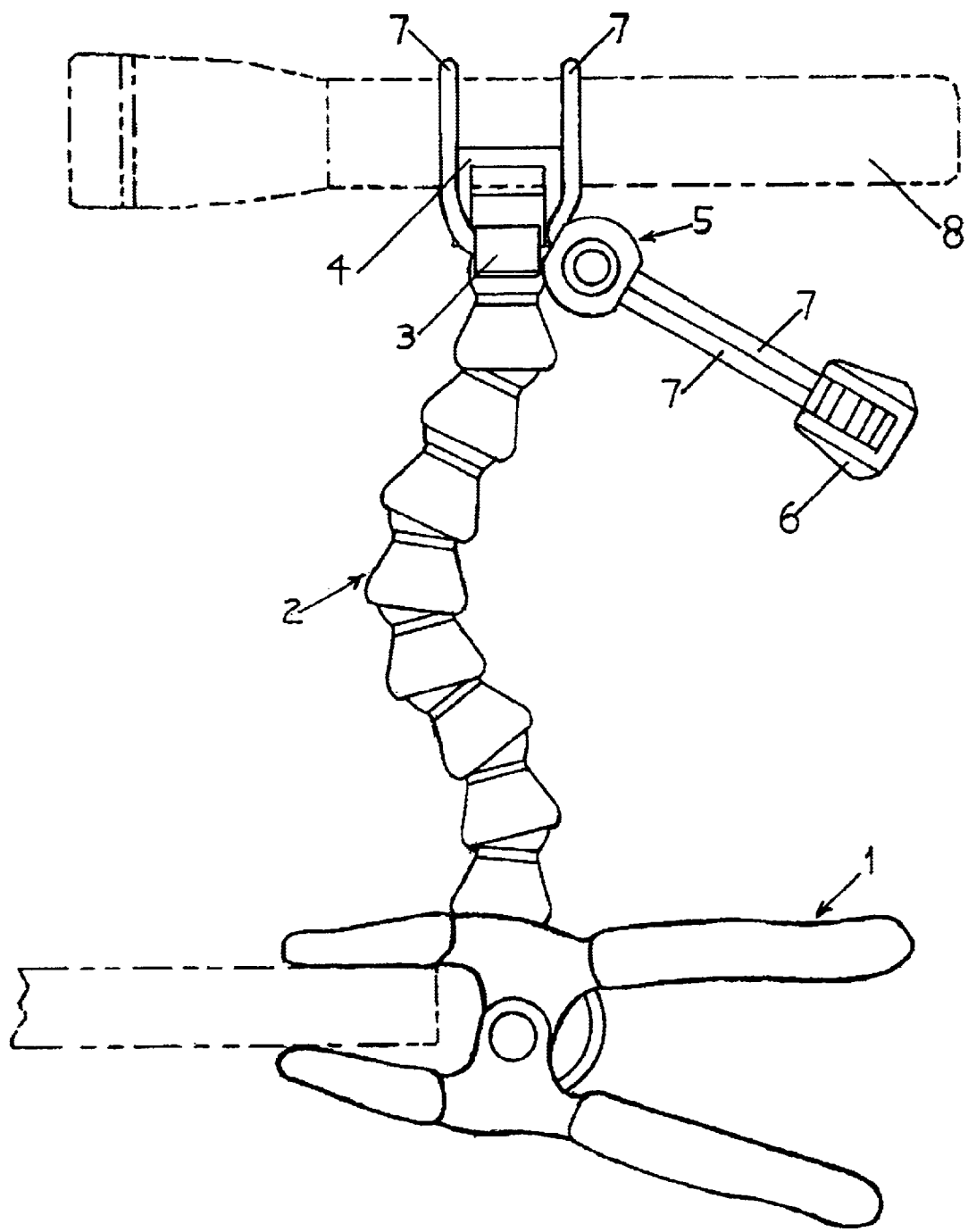
FIG. 1 shows a side view of various aspects of a flashlight holder with a clamp base.
Figure 8:
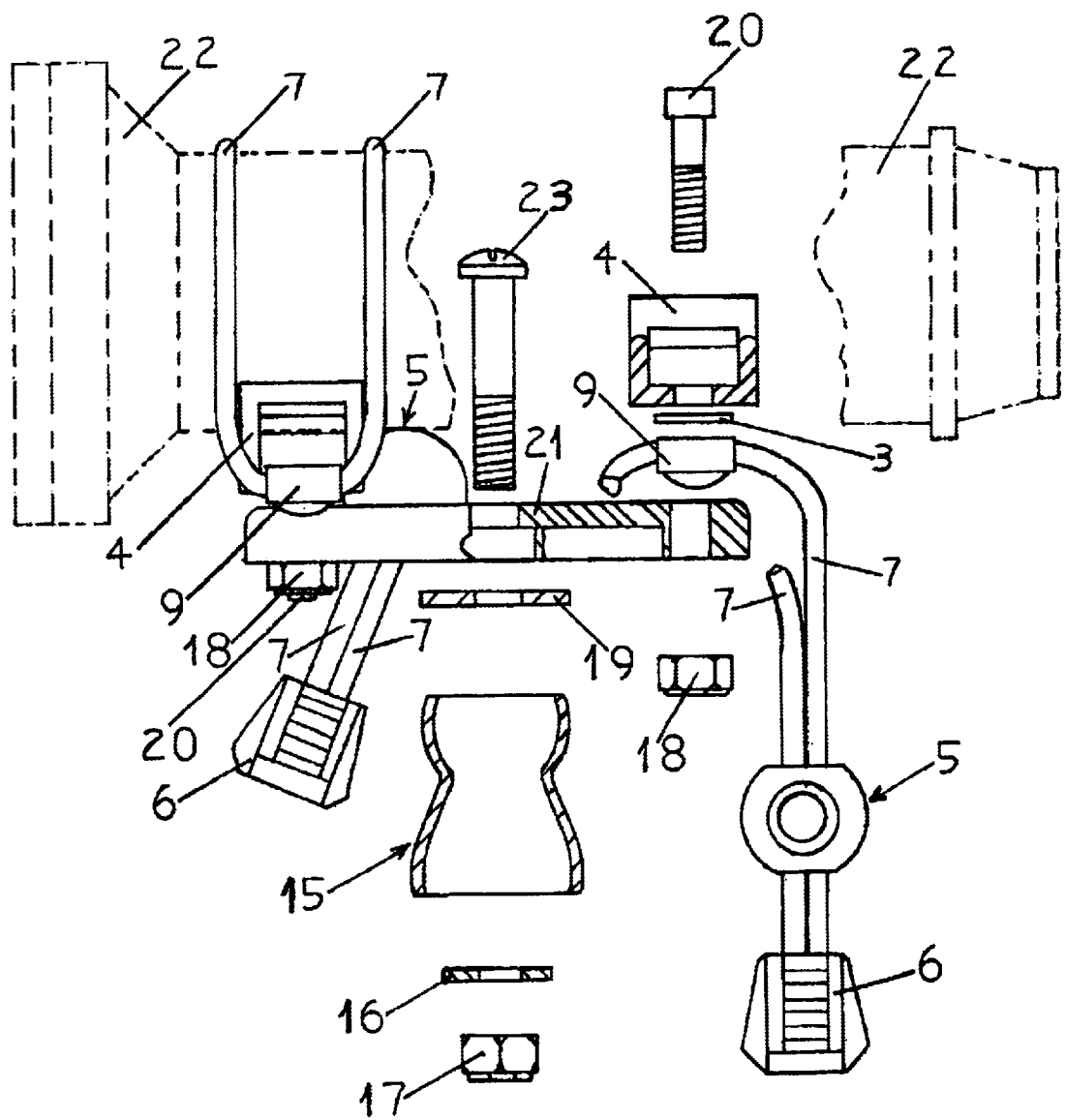
FIG. 8 shows an exploded side view of top assembly of larger version of flashlight holder to hold larger flashlights. This shows the seat assembly with flexible strap tensioning assembly, and also shows how they attach to oversize flexible tube.

A preferred embodiment of the flashlight holder of the present invention is illustrated in FIG. 1–1-8 (side view). The flashlight holder has a clamp base 1 connected to flexible tube 2 which in turn is connected to seat 4. The seat 4 supports flashlight 8 and has a metal retaining clip 3 which retains flexible strap 7. Tension on flexible strap 7 is controlled by a sliding unit 5 and pull 6.

FIGS. 2A–2B,3,4,5,7—Additional Embodiments

Figure 2A:
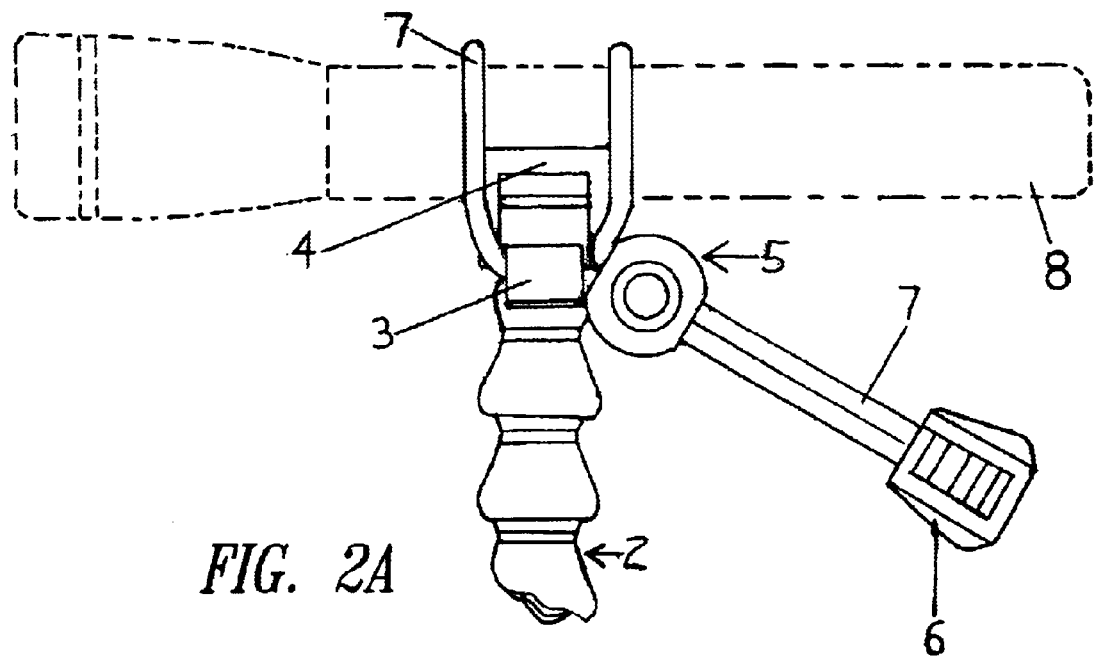
FIGS. 2A to 2B show side views of various aspects of top of flashlight holder assembly including means for attaching flashlight to holder as well as flexible tube and clamp base.
Figure 2B:
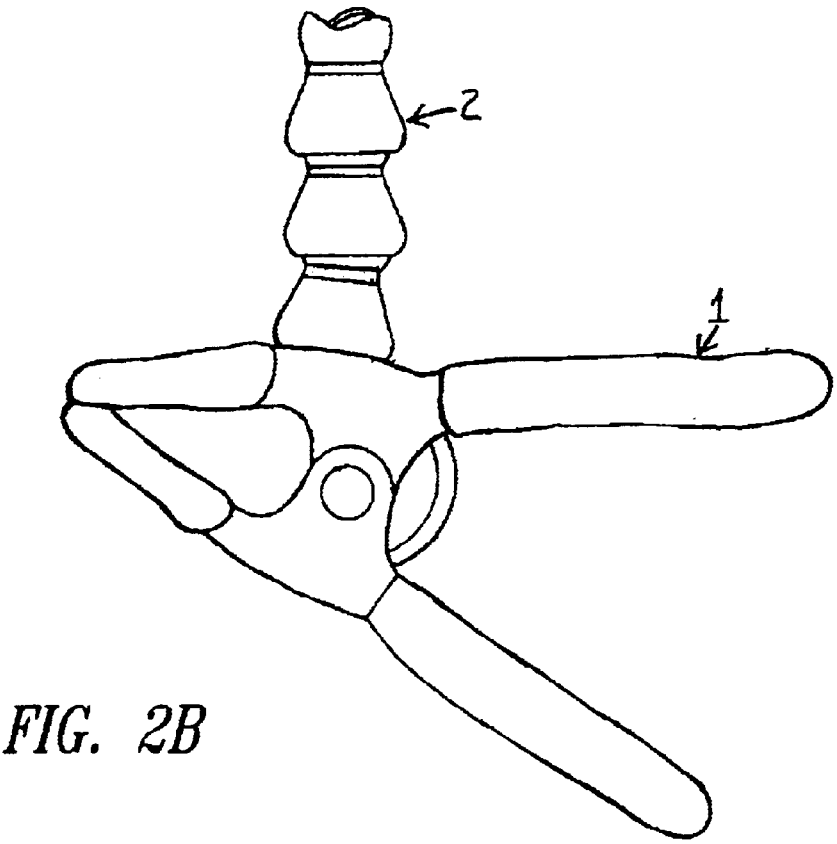
Figure 3:
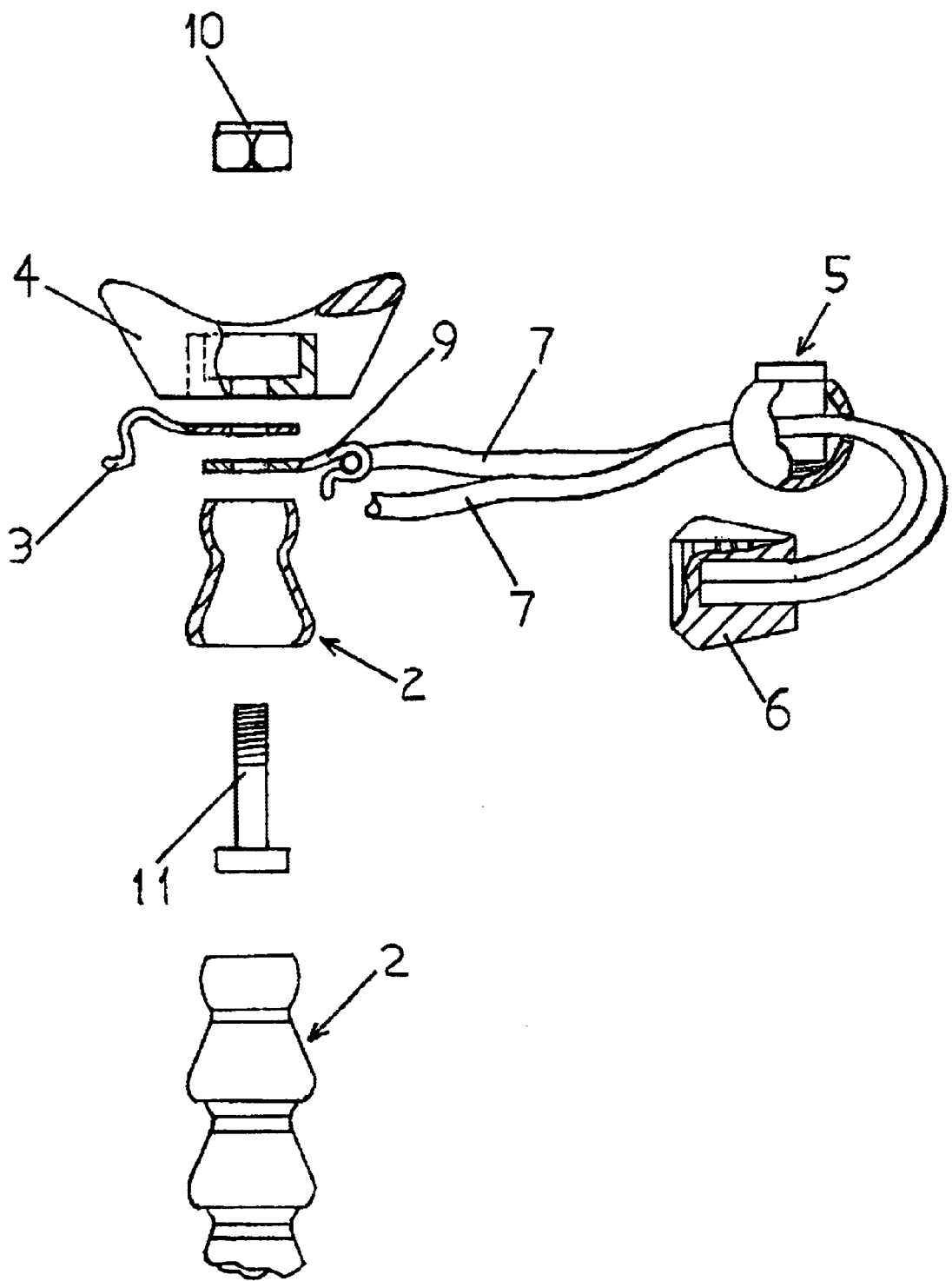
FIG. 3 shows an exploded side view of various aspects of seat assembly with flexible strap tensioning assembly.
Figure 4:
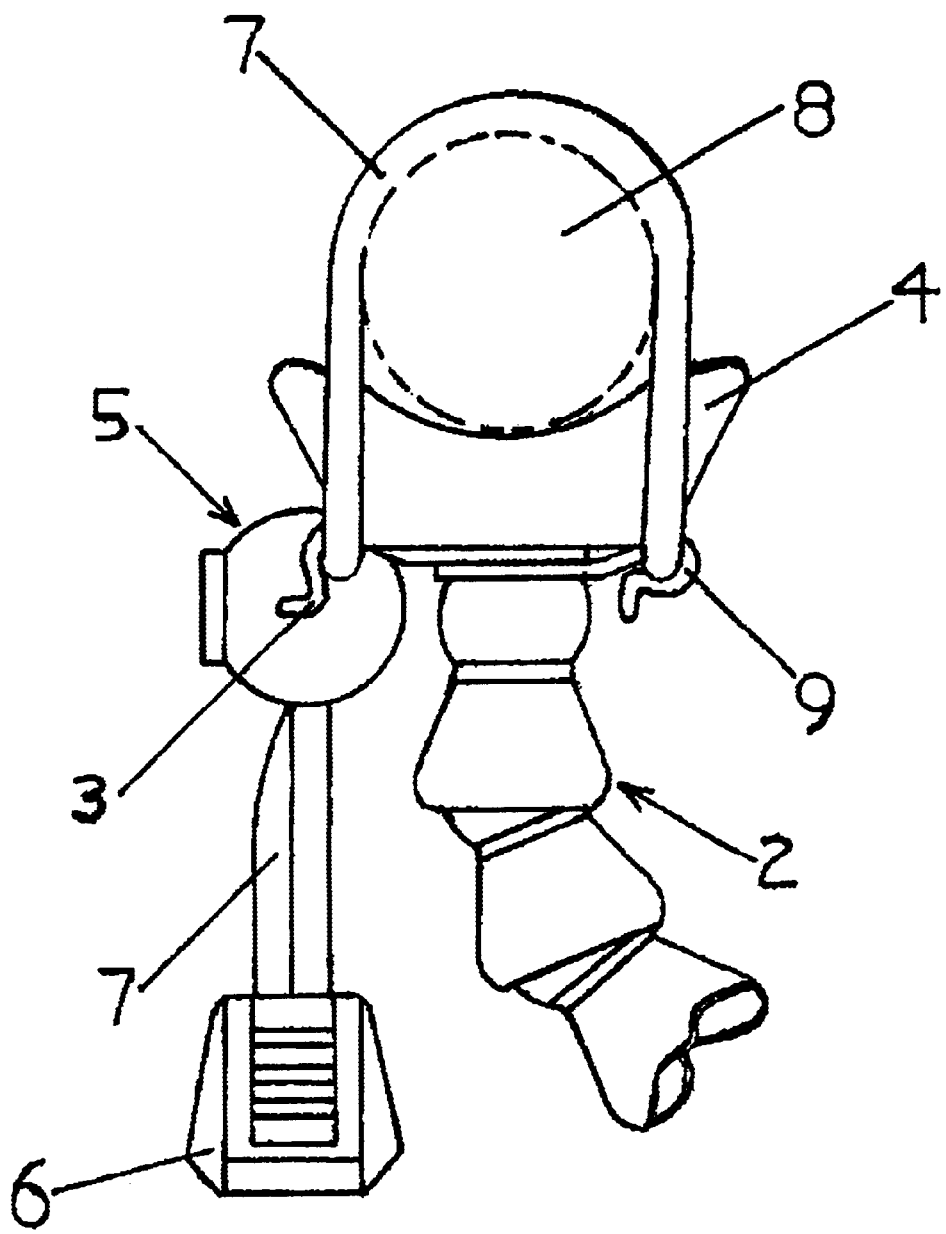
FIG. 4 shows an end view of seat assembly with flexible strap tensioning assembly.
Figure 5:
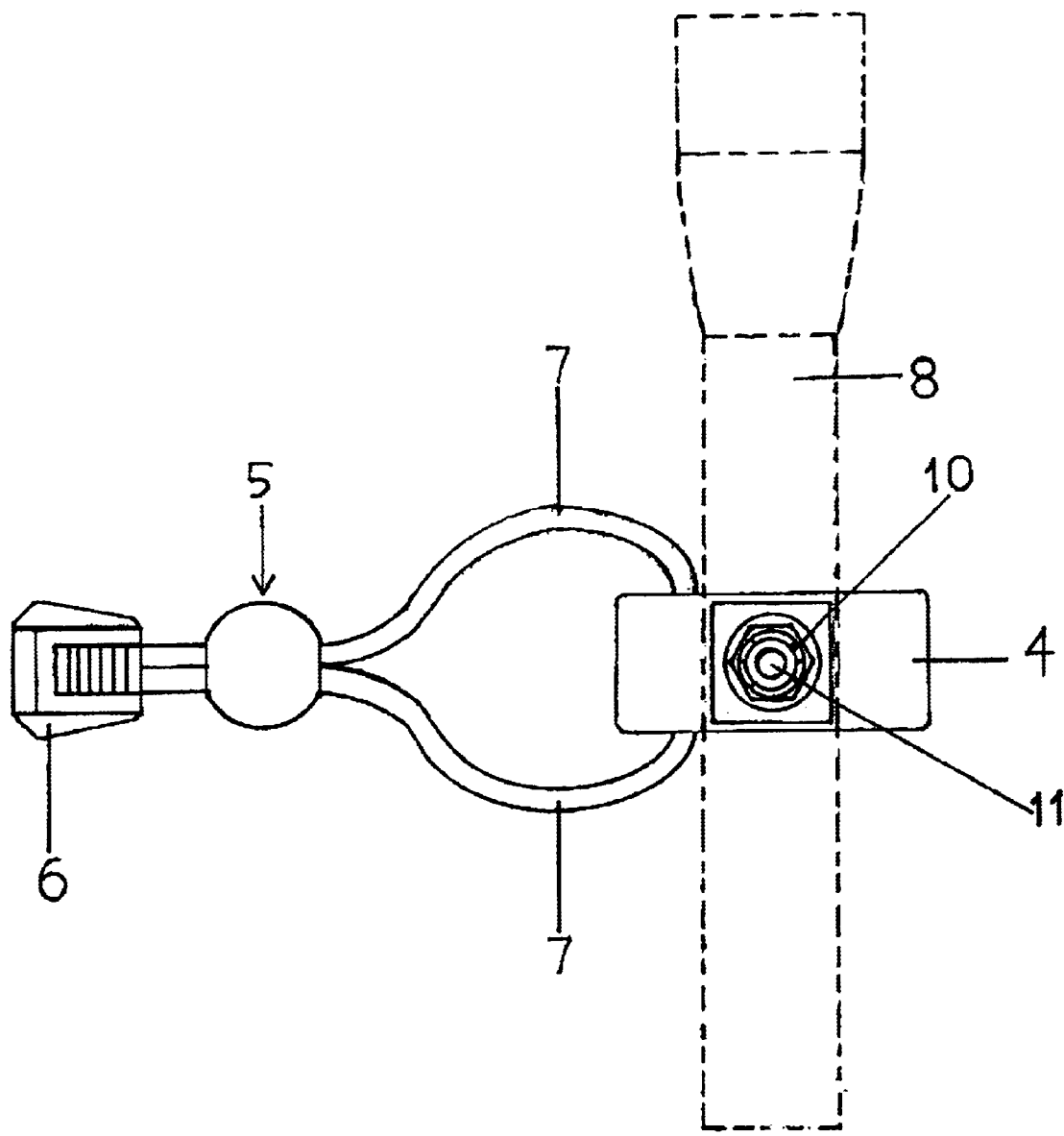
FIG. 5 shows a top view of seat assembly with flexible strap tensioning assembly.
Figure 7:
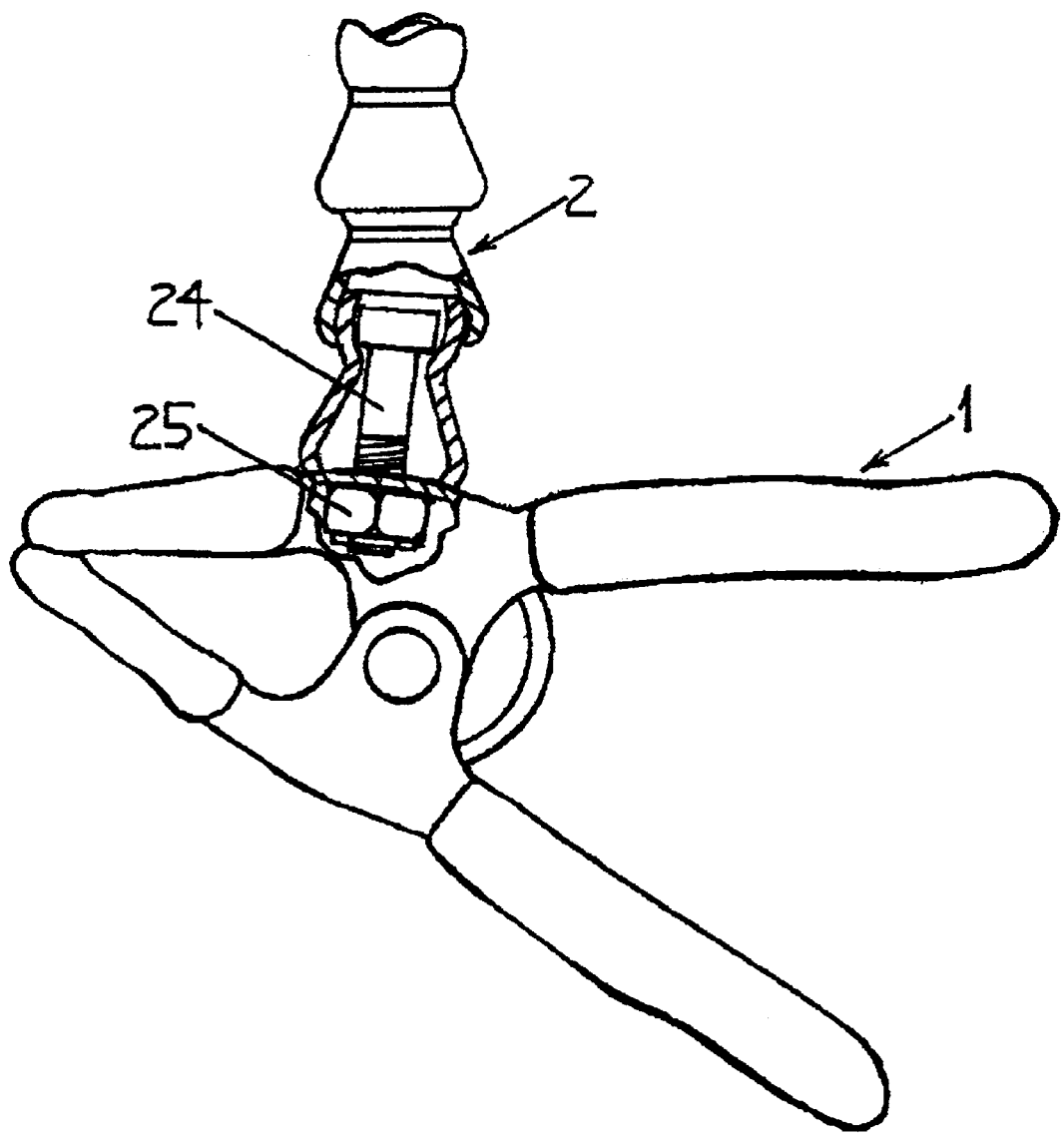
FIG. 7 shows a side view of clamp base assembly connection to flexible tube with fastener.

FIG. 2A is a side view of the top portion of flashlight holder while FIG. 2B is a side view of the bottom of the flashlight holder with a clamp base 1. FIG. 3 is an exploded view of top of flashlight holder with emphasis on the seat 4, the flexible strap tensioning assembly, along with the method of attaching seat 4 to the flexible tube 2. This view shows flexible tube 2, retaining clip 3, seat 4, sliding unit 5, pull 6, flexible strap 7, anchoring retaining clip 9, upper locknut 10, upper fastener 11. FIG. 4 is an end view of top of flashlight holder showing seat 4, flexible strap tensioning assembly with flashlight 8 attached. FIG. 5 is a bottom view of seat assembly and flexible strap tensioning assembly showing seat 4 with upper fastener 11, upper locknut 10, flexible strap 7, sliding unit 5, pull 6, flashlight 8. FIG. 7 is a side view of the bottom of flashlight holder with a cutaway view of flexible tube 2, showing how clamp base 1 attaches to the flexible tube 2 with clamp base fastener 24 and clamp base locknut 25.

FIGS. 6A–6B, 8, 9—Alternative Embodiments

Figure 6A:
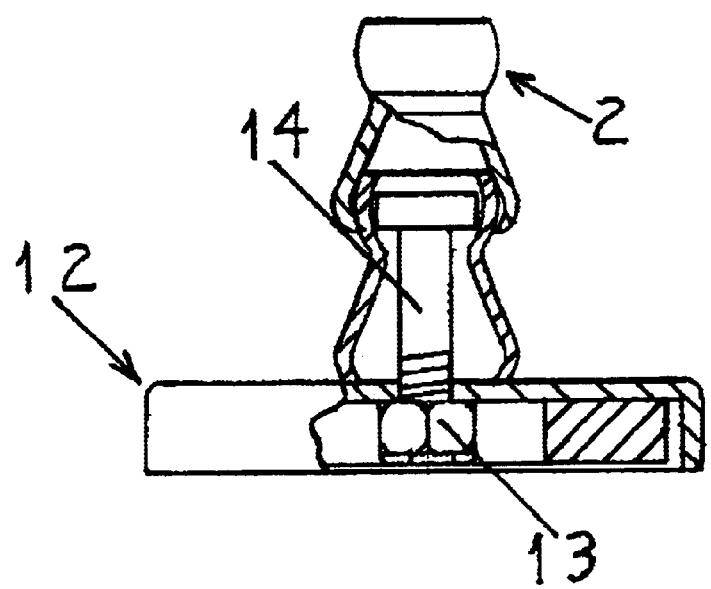
FIG. 6A shows a side view of magnetic base assembly.
Figure 6B:
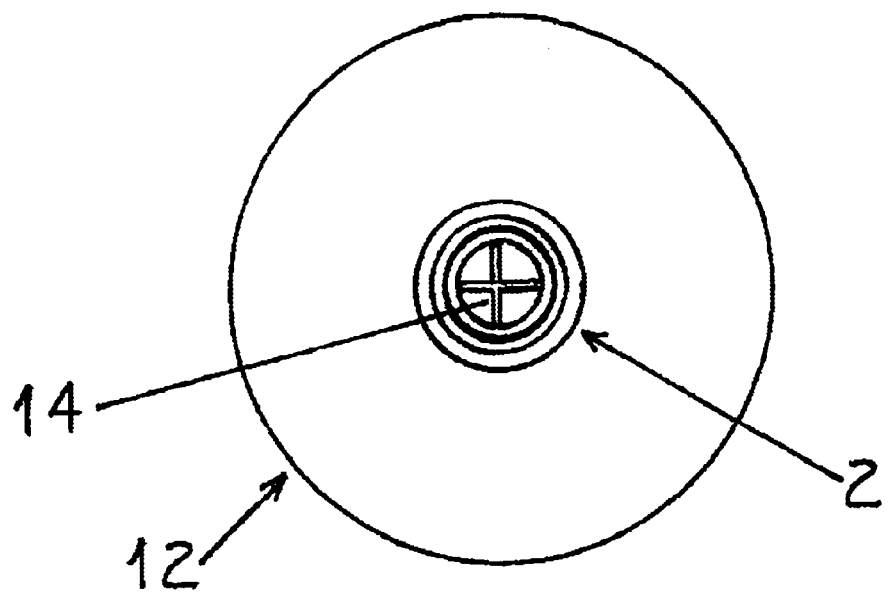
FIG. 6B shows a top view of magnetic base assembly.
Figure 9:
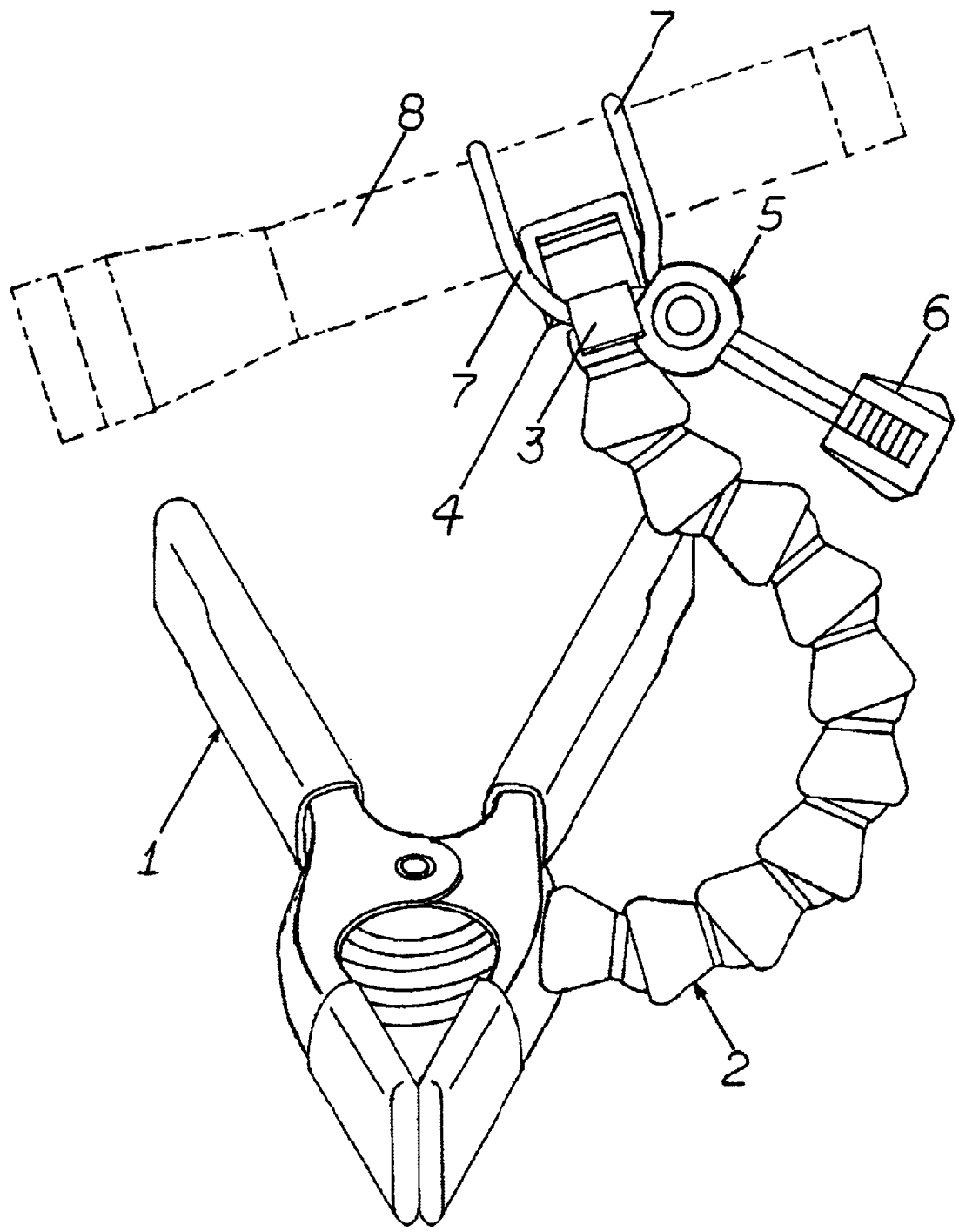
FIG. 9 shows an elevated side view of flashlight holder assembly with clamp base laying on its largest side with flexible tube bent and formed accordingly to create a base in which flashlight holder can rest on a flat surface without the need to use magnetic base or open jaws of clamp base vertically to clamp with a flat surface between jaws.

Alternative embodiments are shown in FIGS. 6A, 6B, 8, and 9. In FIGS. 6A and 6B, the magnetic base is shown 12, attached to flexible tube 2, with magnetic base fastener 14 and magnetic base locknut 13. In FIG. 8 the modified version of the flashlight holder is shown, for use in holding the oversize flashlight 22 with plurality of seats 4, flexible straps 7, oversize fasteners 20,23, oversize locknuts 18, clamp base locknuts 25, washers 16, oversize washers 19, retaining clips 3, anchoring retaining clips 9, as well as a plate 21, not used on the regular flashlight holder which is designed for use on small to average-sized flashlights. In FIG. 9, the clamp base 1 is shown laying down with large profile facing vertically, on a surface connected to flexible tube 2, which is formed to accommodate position of clamp base 1 and has flashlight 8 attached to seat 4 by means of flexible strap 7 which is retained on one end of seat 4 by retaining clip 3, and controlled by sliding unit 5 and pull 6.

Operation—FIGS. 1,3,6,8,9

The flashlight holder can first be attached to a work surface and or supported by a surface by: (1) attaching to surface with the clamp base 1, (2) attaching to surface with a magnetic base 12, (3) setting on a surface by forming a portion of flexible tube 2, large flexible tube 15, and using it in conjunction with clamp base 1 positioned with its large profile placed vertically, to serve as the base. The flashlight holder can accept a flashlight 8, oversize flashlight 22, by engaging it with concave seat(s) 4, pulling flexible strap(s) 7 over flashlight 8, oversize flashlight 22, locking it into retaining clip(s) 3, pushing button in on sliding unit(s) 5 while moving sliding unit(s) 5 along flexible strap(s) 7 and holding one end of flexible strap(s) 7 by grip unit(s) 6, until it is forced to stop because of tension, which is applied to flashlight 8, oversize flashlight 22. Flashlight 8, oversize flashlight 22 can be released by pushing button on sliding unit(s) 5, while moving sliding unit(s) 5 away from flashlight 8, oversize flashlight 22 releasing tension, then being able to unhook flexible strap(s) 7 from retaining clip(s) 3 pulling it free of flashlight 8, oversize flashlight 22 rendering flashlight 8, oversize flashlight 22, completely free to remove from flashlight holder.

Flashlight 8 and oversize flashlight 22 position can be easily moved by simply grasping flexible tube 2, oversize flexible tube 15, and moving it into desired position where it will stay due to relative rigidity of flexible tube 2, oversized flexible tube 15. Flashlight holder can be adjusted in length by simply removing one unit of flexible tube 2, oversize flexible tube 15, by pulling with one hand on either side of unit to be removed and then pushing two halves of flexible tube 2, oversize flexible tube 15 together until they lock into place. To use flashlight holder on a flat surface without having to clamp jaws of clamp base 1 onto a surface, simply bend flexible tube 2, oversize flexible tube 15 horizontally away from clamp base 1 so that clamp base 1 rests with large surface facing vertically and bend flexible tube 2, oversize flexible tube 15, in a relatively vertical position to direct flashlight 8 and oversize flashlight 22 in the intended direction and position.

Advantages

From the description above, a number of advantages of our flashlight holder become evident:

(a) It has a plurality of types of bases, so it can interface with a surface many different ways.
(b) It has a flexible tube which can be moved in an infinite number of positions. This flexible tube is ribbed so that it can be handled, without slipping for example, by a person with wet or greasy hands.
(c) It has a quick and easy means of attaching and detaching flashlights.
(d) It can fit almost any size flashlight, especially the more widely used smaller flashlights.
(e) It is corrosion resistant.
(f) It is affordable for both industry and the consumer.
(g) It has a simple design which is easy for anyone to operate trouble free.
(h) It has components that interface with flashlight which are not damaging to flashlight.

Conclusions, Ramifications, and Scope

Accordingly, the reader will see that our flashlight holder invention can be used to hold flashlights of varying sizes and shapes, securely and without damage. Our flashlight holder invention can be secured to any work surface by magnet, clamp base, or freestanding means. The flexible tube can be moved in any direction to an infinity of positions. Also, our flashlight holder has a stretch cord system of fastening flashlight to holder, which is also adjustable by means of a sliding unit, which makes it superior to the other flashlight holders in that it adjusts to fit virtually any size or shape of flashlight, holding it secure. It also has enough elasticity to hold flashlight secure under high-shock conditions. Furthermore, our flashlight holder has the additional advantages in that it allows flashlight to be attached and detached quickly and easily without damaging flashlight;

it is corrosion resistant for use in outdoor and or marine environments;

it can have its flexible tube be virtually any color;

its adjustment to fit different-sized flashlights is accomplished easily and quickly without any complicated or costly mechanisms;

its base can be any style, shape, or material to secure flashlight holder to a given surface;

it's light in weight;

its elastic cord is not slippery when handled with wet or greasy hands;

its flexible tube can have its movable units added to or removed to adjust length of flexible tube and therefore flashlight holder.

Although the description above contains many specificities, these should not be construed as limiting the scope of the invention but as merely providing illustrations of some of the presently Patent Application of Mike and David Valentine for "Flashlight Holder" continued—Page 10 preferred embodiments of this invention. For example, the flashlight holder can have a flexible tube that does not have the base could be any shape that is desired, etc.

Thus the scope of the invention should be determined by the appended claims and their legal equivalents, rather than by the examples given.

What is claimed is:

1. A flashlight holder having:
   (a) a base for mounting;
   (b) a seat to engage a flashlight;
   (c) a flexible tube attaching said base and said seat together;
   (d) a flexible strap for securing said flashlight, connected at one end of said seat by an anchoring retainer, which stretches across said flashlight perpendicularly to the opposite end of said seat and is held by the anchoring retainer;
   (e) a sliding unit which controls tension on said flexible strap; and
   (f) a grip unit secured to one end of said flexible strap, which aids in holding said flexible strap while said sliding unit is moved along said flexible strap to varying positions to either increase or decrease tension on said flashlight,
   wherein said anchoring retainer comprises two elements, each defined by a straight portion having an opening and a curved portion, wherein the flexible strap is securely trapped on said curved portion.

2. The flashlight holder of claim 1 wherein said base for mounting has a magnet for use on metallic surfaces to secure the flashlight holder to.

3. The flashlight holder of claim 1 wherein said base for mounting is in the form of a clamp having two hinged jaws resiliently biased to one another, in which said flashlight holder can be clamped to a given surface.

4. The flashlight holder of claim 1 wherein said flexible tube is flexible enough to move into desired position, while being rigid enough to retain its shape once moved.

5. The flashlight holder of claim 4 wherein said flexible tube is flexible enough to move away from said base horizontally so that said base is positioned to have its large profile facing vertically to serve as a base from which the balance of said flexible tube can be moved into a relatively vertical position wherein said flashlight holder can rest on a relatively flat surface on its own while holding said flashlight in virtually an infinity of possible positions to direct light.

6. The flashlight holder of claim 5 wherein said flexible tube is made up of a plurality of individual movable and detachable units, making said flashlight holder customizable in terms of length.

7. The flashlight holder of claim 6 wherein said flexible tube has ribs for easy gripping.

8. The flashlight holder of claim 7 wherein said flexible tube is an oversized flexible tube for use with an oversized flashlights.

9. The flashlight holder of claim 8 wherein said seat, said flexible strap, said grip unit, said anchoring retainer, and said retainer are all used in plurality to provide stability for an oversized flashlight, and said seats are connected to a plate that is connected to said oversized flexible tube.

10. The flashlight holder of claim 1 wherein said seat is concave to engage a curved shape of said flashlight, to securely hold the flashlight in place.

11. The flashlight holder of claim 1 wherein said flexible strap is a stretchable, non metallic material, and therefore is corrosion resistant and non damaging to said flashlight.

12. The flashlight holder of claim 1 wherein said sliding unit has a housing with a hole for said flexible strap to go through, which has a button that can be depressed, to release tension on said flexible strap running through the housing of said sliding unit and allow said sliding unit to move along said flexible strap, whereby tension on said flashlight can be increased by moving said sliding unit toward said flashlight or decreased by moving said sliding unit away from said flashlight.

13. The flashlight holder of claim 1 wherein said grip unit comprises a hollow unit on one end in which one end of said flexible strap is pushed into it, but is stopped on another end for the purpose of being gripped, so that said flexible strap can be pulled in a desired direction.

14. The flashlight holder of claim 1 wherein said flexible tube, said base, said seat, said retainer, and said flexible strap are all integrated into said flashlight holder by means of fasteners, washers, and locknuts.

15. The flashlight holder of claim 14 wherein said base, said retainer, said fasteners, said washers, and said locknuts are stainless steel and therefore corrosion resistant.

16. The flashlight holder of claim 15 wherein said fastener, said washer, and said locknut are all oversized for use with an oversized flashlight.

17. The flashlight holder of claim 1 wherein said seat, said grip unit, said sliding unit, and said flexible tube are formed of plastic, and therefore corrosion resistant and non damaging to said flashlight.

18. A flashlight holder comprising:
a first seat for engaging a flashlight;
a first clip positioned on a first side of the seat;
a second clip positioned on a second side of the seat;
a strap secured to the first clip;
means for adjustably securing the strap to the second clip; and
means for positioning the first seat with respect to a surface.

19. The flashlight holder of claim 18, wherein the means for positioning the first seat with respect to a surface comprise means for securing the flashlight holder to a surface.

20. The flashlight holder of claim 19, wherein the means for securing the flashlight holder to a surface comprise a clamp.

21. The flashlight holder of claim 19, wherein the means for securing the flashlight holder to a surface comprise a magnet.

22. The flashlight holder of claim 18, wherein the means for positioning the first seat with respect to a surface comprise a flexible tube comprised of a plurality of tube segments.

23. The flashlight holder of claim 22, wherein at least one of the plurality of tube segments is detachable.

24. The flashlight holder of claim 22, wherein the first seat can be rotated with respect to the flexible tube.

25. The flashlight holder of claim 18, further comprising a second seat for engaging a flashlight coupled to the means for positioning the first seat.

26. The flashlight holder of claim 18, further comprising means for supporting the flashlight holder on a surface.

27. The flashlight holder of claim 18, wherein the means for adjustably securing the strap to the second clip comprise a bead adjustably securable to the strap.

28. A flashlight holder comprising:
a support bar;
a first seat mechanism for engaging a flashlight and secured to the support bar, the first seat mechanism comprising:
a first seat;
a first clip positioned on a first side of the first seat;
a second clip positioned on a second side of the first seat; and
a first strap secured to the first clip and adjustably securable to the second clip for securing a flashlight to the first seat; and
a second seat mechanism for engaging a flashlight and secured to the support bar, the second seat mechanism comprising:
a second seat;
a third clip positioned on a first side of the second seat;
a fourth clip positioned on a second side of the second seat; and
a second strap secured to the third clip and adjustably securable to the fourth clip for securing a flashlight to the second seat.

29. The flashlight holder of claim 28, further comprising a flexible tube coupled to the support bar, wherein the support bar can be rotated with respect to the flexible tube.

30. The flashlight holder of claim 29, wherein the flexible tube comprises a plurality of segments.

31. The flashlight holder of claim 30, wherein at least one of the plurality of segments is detachable.

32. The flashlight holder of 28, further comprising a clamp coupled to the support bar.

33. The flashlight holder of claim 28, further comprising a magnet coupled to the support bar.

34. The flashlight holder of claim 28, further comprising a bead adjustably securable to the first strap.

* * * * *